United States Patent
Wu et al.

(10) Patent No.: US 9,647,484 B2
(45) Date of Patent: May 9, 2017

(54) WIRELESS CHARGING TRANSCEIVER DEVICE AND WIRELESS CHARGING CONTROL METHOD

(71) Applicant: WISTRON CORP., New Taipei (TW)

(72) Inventors: Wen-Chin Wu, New Taipei (TW); Yi-Sheng Kao, New Taipei (TW); Yao-Tsung Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 163 days.

(21) Appl. No.: 14/811,656

(22) Filed: Jul. 28, 2015

(65) Prior Publication Data
US 2016/0261134 A1   Sep. 8, 2016

(30) Foreign Application Priority Data

Mar. 4, 2015 (TW) .............................. 104106896 A

(51) Int. Cl.
| | |
|---|---|
| *H02J 7/00* | (2006.01) |
| *H01F 27/42* | (2006.01) |
| *H01F 37/00* | (2006.01) |
| *H02J 7/02* | (2016.01) |
| *H02J 50/12* | (2016.01) |

(52) U.S. Cl.
CPC .............. *H02J 7/025* (2013.01); *H02J 50/12* (2016.02)

(58) Field of Classification Search
CPC ....................................................... H02J 7/025
USPC ....................................................... 320/108
See application file for complete search history.

(56) References Cited

U.S. PATENT DOCUMENTS

| | | | | |
|---|---|---|---|---|
| 2012/0112553 | A1* | 5/2012 | Stoner, Jr. ............... | H02J 5/005 307/104 |
| 2013/0049475 | A1* | 2/2013 | Kim ....................... | H02J 5/005 307/75 |

FOREIGN PATENT DOCUMENTS

| | | |
|---|---|---|
| CN | 202231472 U | 5/2012 |
| CN | 203840066 U | 9/2014 |

OTHER PUBLICATIONS

Taiwan Office Action dated Jan. 18, 2016 as received in TW104106896.

* cited by examiner

*Primary Examiner* — Edward Tso
*Assistant Examiner* — Ahmed Omar
(74) *Attorney, Agent, or Firm* — Maschoff Brennan

(57) ABSTRACT

A wireless charging transceiver device includes an energy storage module, a coil, a switch module, a rectifier circuit, and a resonant circuit. The coil is used to induce an external magnetic field or receive an external charging signal, and is used to transmit a wireless charging signal. The switch module is used to be coupled between the energy storage module and the coil through a first or second electrical path. The rectifier circuit is coupled between the energy storage module and the switch module, and is sited in the first electrical path, and rectifying a first inducing current which is induced from the external magnetic field in a first mode. The resonant circuit is coupled between the energy storage module and the switch module, and is sited in the second electrical path.

15 Claims, 9 Drawing Sheets

WIRELESS CHARGING TRANSCEIVER DEVICE AND WIRELESS CHARGING CONTROL METHOD

CROSS-REFERENCE TO RELATED APPLICATIONS

This non-provisional application claims priority under 35 U.S.C. §119(a) on Patent Application No. 104106896 filed in Taiwan, R.O.C. on Mar. 4, 2015, the entire contents of which are hereby incorporated by reference.

BACKGROUND

Technical Field

The present disclosure relates to a wireless charging transceiver device and a wireless charging control method, particularly relates to a wireless charging transceiver device and a wireless charging control method which generate power autonomously.

Description of the Related Art

As the advancement of modern technology, types of electronic devices are increasing and the demands for the power are also gradually increasing, so that the people's needs for power banks are soaring accordingly. Besides, different electronic devices require connectors with different specifications to transfer electricity. However, it is inconvenient for users who want to charge the devices instantly without carrying the corresponding connector. Therefore, a power bank capable of wireless charging by electromagnetic conversion is needed.

It is convenient for users to charge the electronic device by placing the device within the effective charging range of the power bank with wireless charging function. However, the current wireless charging technology does not reach 100% of energy conversion and usually about 30% of the energy is wasted during charging. Compared to the traditional power banks with physical wires for charging, the power banks with the wireless charging function require a larger battery than the electronic device for charging to provide equal electricity capacity. Therefore, the power banks with wireless charging function are larger and inconvenient for users to carry.

SUMMARY

A wireless charging transceiver device includes an energy storage module, a coil, a switch module, a rectifier circuit, and a resonant circuit. The coil is for inducing an external magnetic field or receiving an external charging signal and sending a wireless charging signal. The switch module is for coupling the energy storage module to the coil with a first electrical path or a second electrical path selectively. The rectifier circuit is in the first electrical path, and is coupled between the energy storage module and the switch module, for rectifying a first inducing current induced from the first electrical path by the external magnetic field in a first mode. The resonant circuit is in the second electrical path, and is coupled between the energy storage module and the switch module, wherein the wireless charging signal is sent to the coil through the second electrical path in a second mode and a second inducing current is induced in the second electrical path according to the external charging signal in a third mode. The first inducing current and the second inducing current are charging currents recharged to the energy storage module.

A wireless charging control method for a wireless charging transceiver device is provided. The wireless charging transceiver device has a magnetic body, a coil, a resonant circuit, and an energy storage module, the magnetic body near the coil, the resonant circuit coupled to the energy storage module, the coil selectively coupled to the resonant circuit. The method includes determining whether the magnetic body moves respect to the coil, when the magnetic body moves respect to the coil, a first inducing current is converted to direct current (DC) and recharged to the energy storage module, wherein the first inducing current is induced when the coil induces an external magnetic field, and the external magnetic field is generated according to the movement of the magnetic body respect to the coil, when the magnetic body does not move respect to the coil, further determining whether the resonant circuit resonates with the coil, and when the resonant circuit resonates with the coil, the wireless charging transceiver device receiving an external charging signal or sending a wireless charging signal, wherein the external charging signal is generated by a wireless charging transmission device, and the wireless charging transceiver device induces a second inducing current when the wireless charging transceiver device receives the external charging signal, and the wireless charging transceiver device converts the second inducing current to DC and recharges the second inducing current to the energy storage module, and a wireless charging receiving device performs wireless charging through the wireless charging signal when the wireless charging transceiver device sends the wireless charging signal.

A wireless charging control method for a wireless charging transceiver device is provided. The wireless charging transceiver device has a magnetic body, a coil, a resonant circuit, and an energy storage module. The magnetic body is near the coil, and the resonant circuit is coupled to the energy storage module, and the coil selectively is coupled to the resonant circuit. The method includes determining whether the resonant circuit resonates with the coil, when the resonant circuit resonates with the coil, the wireless charging transceiver device receiving an external charging signal or sending a wireless charging signal, wherein the external charging signal is generated by a wireless charging transmission device, and the wireless charging transmission device generates a first inducing current when receiving the external charging signal, and the wireless charging transmission device converts the first inducing current to DC and recharges the first inducing current to the energy storage module, and a wireless charging receiving device performs wireless charging by inducing the wireless charging signal when the wireless charging transceiver device sends the wireless charging signal, and when the resonant circuit does not resonate with the coil, further determining whether the magnetic body moves respect to the coil to selectively convert a second inducing current to DC and recharge the second inducing current to the energy storage module, wherein the second inducing current is induced when the coil induces an external magnetic field, and the external magnetic field is generated by the movement of the magnetic body respect to the coil.

BRIEF DESCRIPTION OF THE DRAWINGS

The present disclosure will become more fully understood from the detailed description given hereinbelow and the accompanying drawings, which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The figures in the present disclosure are simplified diagrams for illustrating the basic concepts of the present disclosure. Therefore, only the related components are labeled in the figures and the components are not illustrated with real numbers, shapes, sizes, and ratios. The practical sizes for implementation are selective according to the design, and the layout of the components can be more complicated.

Figure 1:
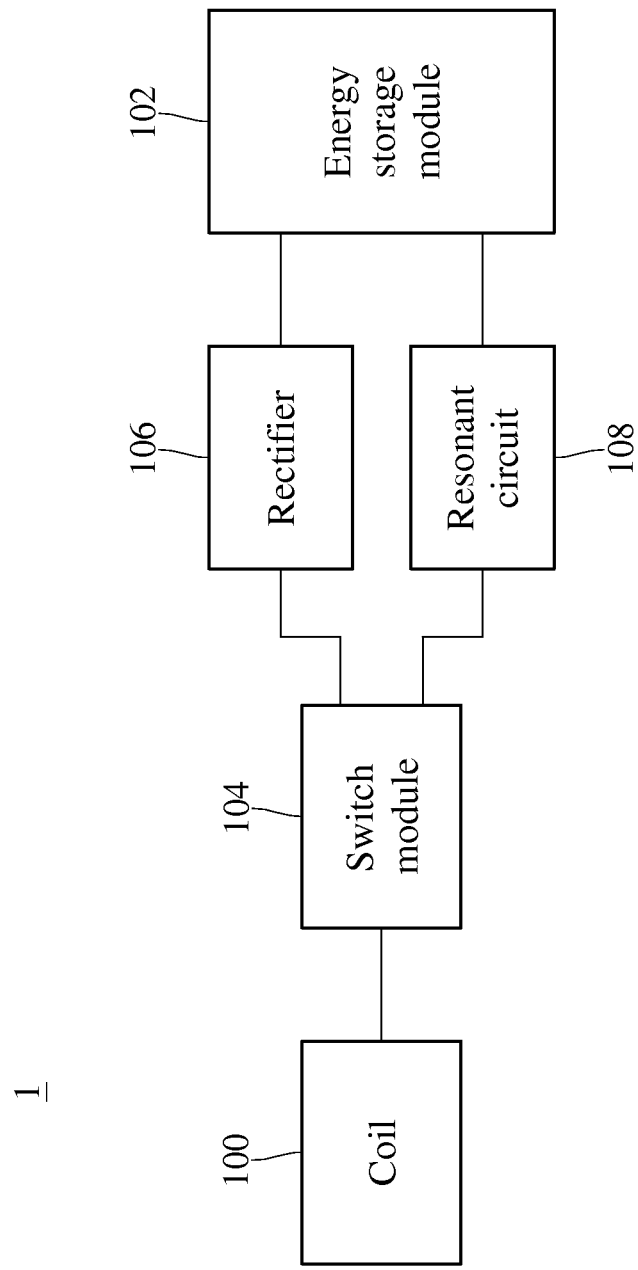
FIG. 1 is a functional block diagram of a wireless charging transceiver device according to a first embodiment.

Please refer to FIG. 1. FIG. 1 is a functional block diagram of a wireless charging transceiver device according to a first embodiment. As shown in FIG. 1, the wireless charging transceiver device 1 includes a coil 100, an energy storage module 102, a switch module 104, a rectifier circuit 106, and a resonant circuit 108. The coil 100 is coupled to the switch module 104, and the rectifier circuit 106 is coupled between the coil 100 and the energy storage module 102, and the resonant circuit 108 is coupled between the coil 100 and the energy storage module 102. The wireless charging transceiver device 1 of the present disclosure includes 3 modes and the first mode of the wireless charging transceiver device 1 is capable of autonomous charging to charge the energy storage module 102 of the wireless charging transceiver device 1, and the second mode of the wireless charging transceiver device 1 is capable of sending wireless charging signal to charge other wireless charging receiving devices, and the third mode of the wireless charging transceiver device 1 is capable of receiving the external charging signal generated by other wireless charging transmission device to charge the energy storage module 102. Each of functional modules of the wireless charging transceiver device 1 are specifically explained hereinafter.

The coil 100 is for inducing an external magnetic field or receiving an external charging signal, and for sending a wireless charging signal. In practice, the external magnetic field is a time-varying magnetic field and the external charging signal is an electromagnetic signal sent by other wireless charging transmission device which is regarded as a power supply terminal of wireless charging. The wireless charging signal is the electromagnetic signal sent by the wireless charging transceiver device 1 when the wireless charging transceiver device 1 is performing wireless charging to other wireless charging receiving device which is regarded as a power receiving terminal of wireless charging. In actual operations, when the coil 100 induces the external magnetic field or receives the external charging signal, the coil 100 generates corresponding induced current according to the electromagnetic induction, and when there is an electric current passing through the coil 100, the coil 100 generates the wireless charging signal because of the magnetic effect of electric current and the wireless charging signal is sent to other wireless charging receiving device.

The energy storage module 102 is for storing electricity and selectively performing charging or discharging according to the working model of the wireless charging transceiver device 1, wherein charging stands for storing energy and discharging stands for releasing energy. In actual operations, the energy storage module 102 performs charging when the wireless charging transceiver device 1 operates in the first model, and the energy storage module 102 performs discharging when the wireless charging transceiver device 1 operates in the second model, and the energy storage module 102 performs charging when the wireless charging transceiver device 1 operates in the third model. In practice, the energy storage module 102 is a rechargeable battery pack or an electric double layer capacitor (EDLC). When the energy storage module 102 is a rechargeable battery pack, the rechargeable battery pack includes at least one battery unit and the battery unit is but not limited to a lithium polymer battery, a lithium-ion battery, a nickel-metal hydride battery, or a nickel-cadmium battery. In addition, the connections or numbers of the battery unit or the super capacitor are not limited by the present disclosure. For example, in an embodiment, two or more battery units are concatenated as a rechargeable battery pack.

The switch module 104 has a first switch node, a second switch node, and a common node. The common node is coupled to an end of the coil 100, and the first switch node is coupled to the rectifier circuit 106, and the second switch node is coupled to the resonant circuit 108. In actual operations, the switch module 104 is for selectively coupling the coil 100 to the energy storage module 102 with the first electrical path or the second electrical path. More specifically, when the common node of the switch module 104 is coupled to the first switch node, the coil 100 is coupled to the energy storage module 102 through the first electrical path by the switch module 104, and when the common node of the switch module 104 is coupled to the second switch node, the coil 100 is coupled to the energy storage module 102 with the second electrical path by the switch module 104. In other words, the rectifier circuit 106 is in the first electrical path and the resonant circuit 108 is in the second electrical path.

The rectifier circuit 106 is for rectify the current passing through the first electrical path. In actual operations, when the wireless charging transceiver device 1 operates in the first mode, the coil 100 is coupled to the energy storage module 102 through the first electrical path by the switch module 104. Meanwhile, the rectifier circuit 106 is rectify to the first inducing current induced by the external magnetic field in the first electrical path, and the rectified first inducing current is stored in the energy storage module 102. In other words, the first inducing current is the charging current which is recharged to the energy storage module 102, and the function of the first inducing current is but not limited to a alternating-current signal or a sine wave signal with a positive phase. In practice, the rectifier circuit 106 is but not limited to a half-wave rectifier, bridge rectifier, or a center tapped rectifier.

The resonant circuit 108 is for resonating with the coil 100 when the wireless charging transceiver device 1 operates in the second mode or the third mode. In actual operations, when the wireless charging transceiver device 1 operates in the second mode, the wireless charging signal is sent to the coil 100 through the second electrical path. When the wireless charging transceiver device 1 operates in the third mode, the resonant circuit 108 induces the second inducing current in the second electrical path according to the external charging signal, and the second inducing current is the charging current which is recharged to the energy storage module 102. In practice, the resonant circuit 108 is composed of capacitors, inductors, and resistors, and the resonant circuit 108 is a series connected resonant circuit or a parallel connected resonant circuit.

In actual operations, during the process of recharging the second inducing current to the energy storage module 102, the second inducing current firstly passes through a rectifier, and the rectifier is between the resonant circuit 108 and the energy storage module 102, or is integrated into the rectifier circuit 106. The embodiment is for illustrating but not for limiting the present disclosure. In addition, there is a chopper between the rectifier circuit 106 and the energy storage module 102, or between the resonant circuit 108 and the energy storage module 102 to adjust the amount of the charging current. Persons skilled in the art are able to understand that the circuit for charging and discharging the energy storage module 102 is designed selectively, and the details of the circuits of the energy storage module 102, the rectifier circuit 106, and the resonant circuit 108 are not limited by the present disclosure.

Figure 2:
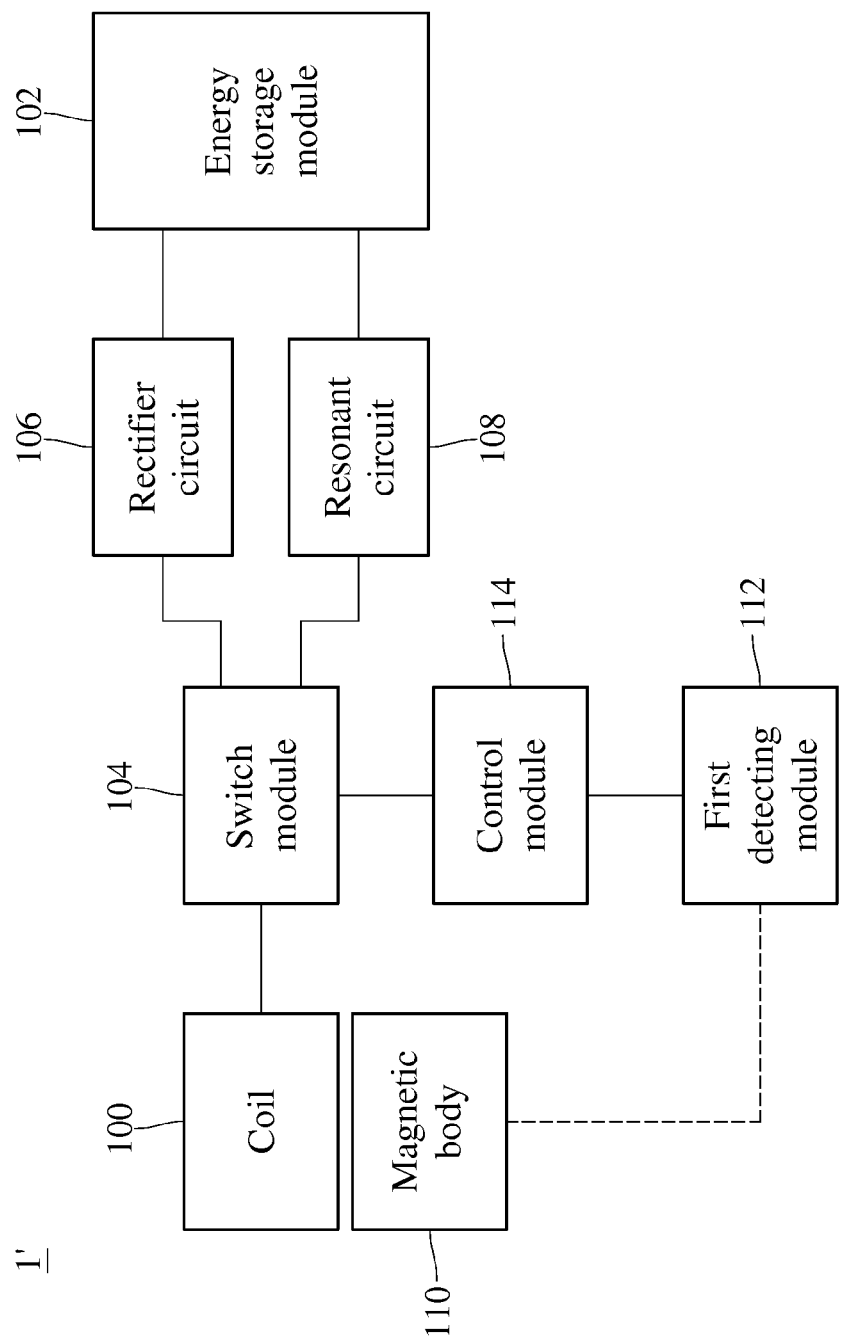
FIG. 2 is a functional block diagram of a wireless charging transceiver device according to a second embodiment.

Please refer to FIG. 2. FIG. 2 is a functional block diagram of a wireless charging transceiver device according to a second embodiment. As shown in FIG. 2, the wireless charging transceiver device 1' includes a coil 100, an energy storage module 102, a switch module 104, a rectifier circuit 106, a resonant circuit 108, a magnetic body 110, a first detecting module 112, and a control module 114. In the present embodiment, most of the functions of the wireless charging transceiver device 1' are the same as the functions of the wireless charging transceiver device 1 in the previous embodiment, and are not further explained hereinafter.

The difference between the wireless charging transceiver device 1' and the wireless charging transceiver device 1 is that the wireless charging transceiver device 1' in the present embodiment further includes a magnetic body 110, a first detecting module 112, and a control module 114. The control module 114 is coupled between the first detecting module 112 and the switch module 104. The magnetic body 110 is near the coil 100, and the magnetic body 110 moves respect to the coil 100. When the magnetic body 110 moves respect to the coil 100, the coil 100 generates the first inducing current because of inducing the variation of the magnetic flux. The position of the magnetic body 110 in the wireless charging transceiver device 1' is not limited by the present disclosure. For example, the magnetic body 110 is in the extension direction of the central axis of the coil 100, and when a user shakes the wireless charging transceiver device 1', the magnetic body 110 moves along the central axis of the coil 100 repeatedly, so that the coil 100 generates the first inducing current accordingly.

The first detecting module 112 is for detecting whether the magnetic body 110 moves respect to the coil 100 and generating the corresponding first detecting signal according to the determined result. The first detecting signal is for indicating the movement range of the magnetic body 110 respects to the coil 100, in other words, the movement range of the magnetic body 110. Because the first detecting module 112 does not perform the detection and determination by a physical circuit coupled to the magnetic body 110, the first detecting module 112 in FIG. 2 is connected to the magnetic body 110 through a dash line. In practice, the first detecting module 112 is but not limited to a phase locked loop circuit (PLL), a crystal oscillator, or a gravity sensor. In addition, in actual operations, the first detecting module 112 determines whether the magnetic body 110 moves respect to the coil 100 and the movement range thereof by detecting a variation of a certain resistance value.

The control module 114 is for determining whether the first inducing current generated by the coil 100 reaches the energy conversion efficiency according to the first detecting signal to selectively control the switch module 104 to couple the coil 100 to the energy storage module 102 through the first electrical path. More specifically, when the control module 114 determines that the first inducing current generated by the coil 100 reaches the energy conversion efficiency, the control module 114 outputs a control signal to the switch module 104, so that the switch module 104 couples the common node to the first switch node according to the control signal and the wireless charging transceiver device 1' operates in the first mode. The practical value of the energy conversion efficiency is not limited by the present disclosure, and persons skilled in the art are able to design reasonable energy conversion efficiency according to the practical need of the wireless charging transceiver device.

Figure 3:
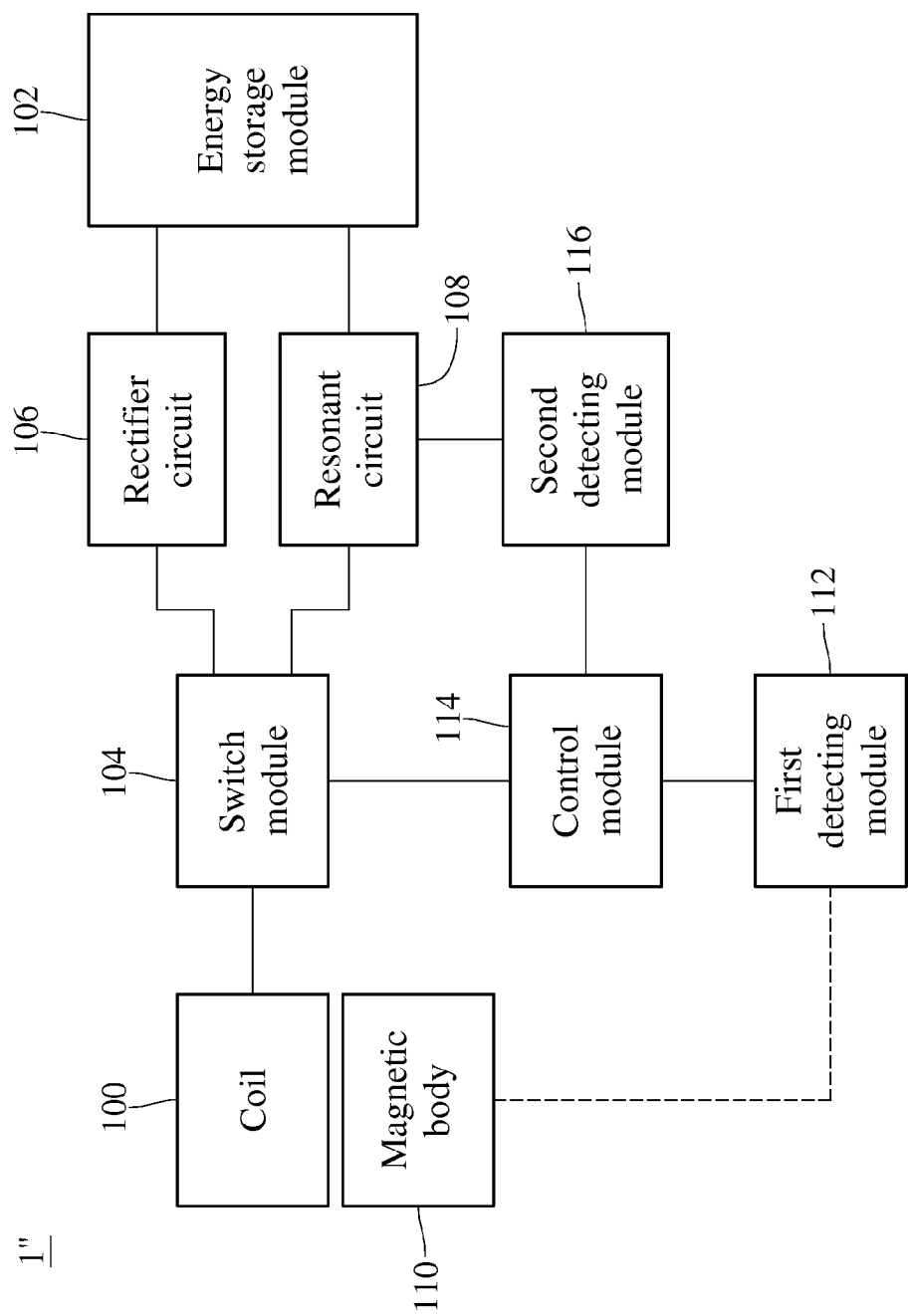
FIG. 3 is a functional block diagram of a wireless charging transceiver device according to a third embodiment.

Please refer to FIG. 3. FIG. 3 is a functional block diagram of a wireless charging transceiver device according to a third embodiment. As shown in FIG. 3, the wireless charging transceiver device 1" includes a coil 100, an energy storage module 102, a switch module 104, a rectifier circuit 106, a resonant circuit 108, a magnetic body 110, a first detecting module 112, a control module 114, and a second detecting module 116. In the present embodiment, most of the functions of the wireless charging transceiver device 1" are the same as the functions of the wireless charging transceiver device 1' in the previous embodiment, and are not further explained hereinafter.

The difference between the wireless charging transceiver device 1" and the wireless charging transceiver device 1' is that the wireless charging transceiver device 1" in the present embodiment further includes a second detecting module 116. The second detecting module 116 is coupled between the resonant circuit 108 and the control module 1147. The second detecting module 116 is for detecting whether the resonant circuit 108 resonates with the coil 100 and generating a second detecting signal accordingly. The second detecting signal is for indicating the resonant frequency of the resonant circuit 108. In actual operations, when the coil 100 of the wireless charging transceiver device 1" receives the external charging signal and induces the second inducing current in the second electrical path, that is, the wireless charging transceiver device 1" operates in the third mode, the control module 114 controls the second inducing current to perform direct current (DC) conversion according to the second detecting signal generated by the second detecting module 116, so that the DC converted second inducing current is recharged to the energy storage module 102.

In addition, in order to increase the amount of the first inducing current generated when the magnetic body 110 moves respect to the coil 100, the wireless charging transceiver device 1' and the wireless charging transceiver device 1" in the present disclosure further includes an elastic unit. The elastic unit is connected to the magnetic body 110 and is for storing energy when the wireless charging transceiver device 1' or 1" shakes and the magnetic body 110 moves respect to the coil 100, and the elastic unit is also for releasing the temporarily stored energy when the wireless charging transceiver device 1' or 1" stops shaking In practice, the elastic unit is but not limited to a spring, an elastomer, or any other elastic structure.

Figure 4A:
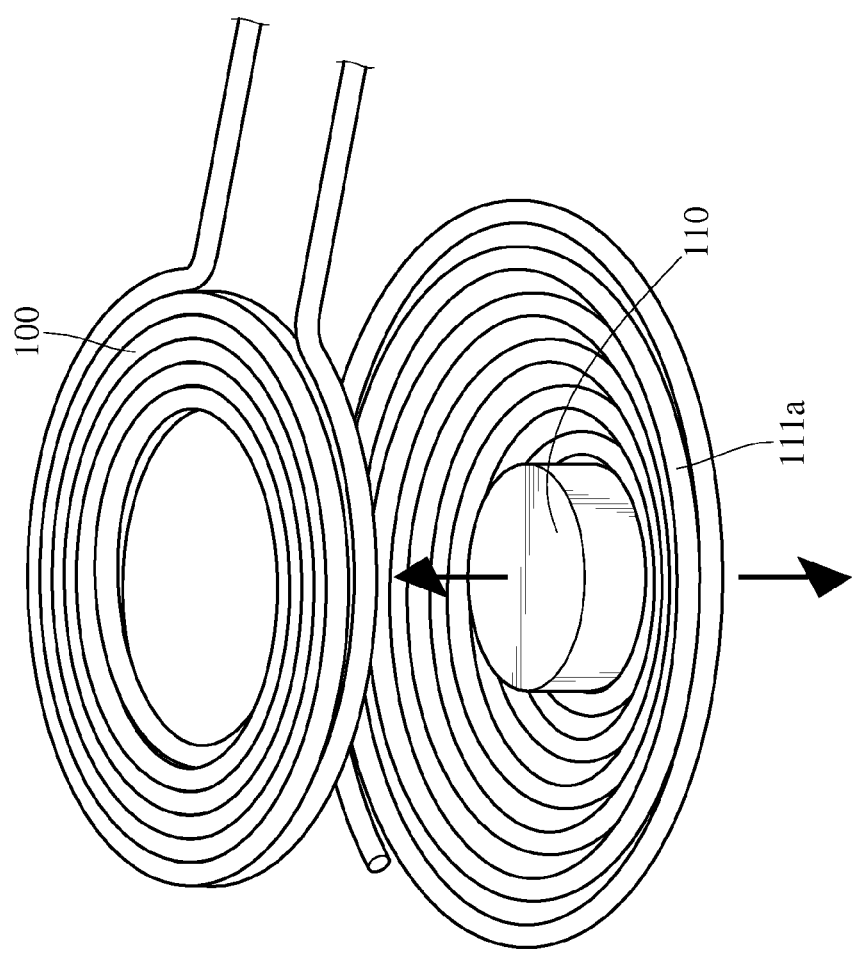
FIG. 4A is a structural diagram of the coil, the magnetic body, and the elastic unit according to the first embodiment.
Figure 4B:
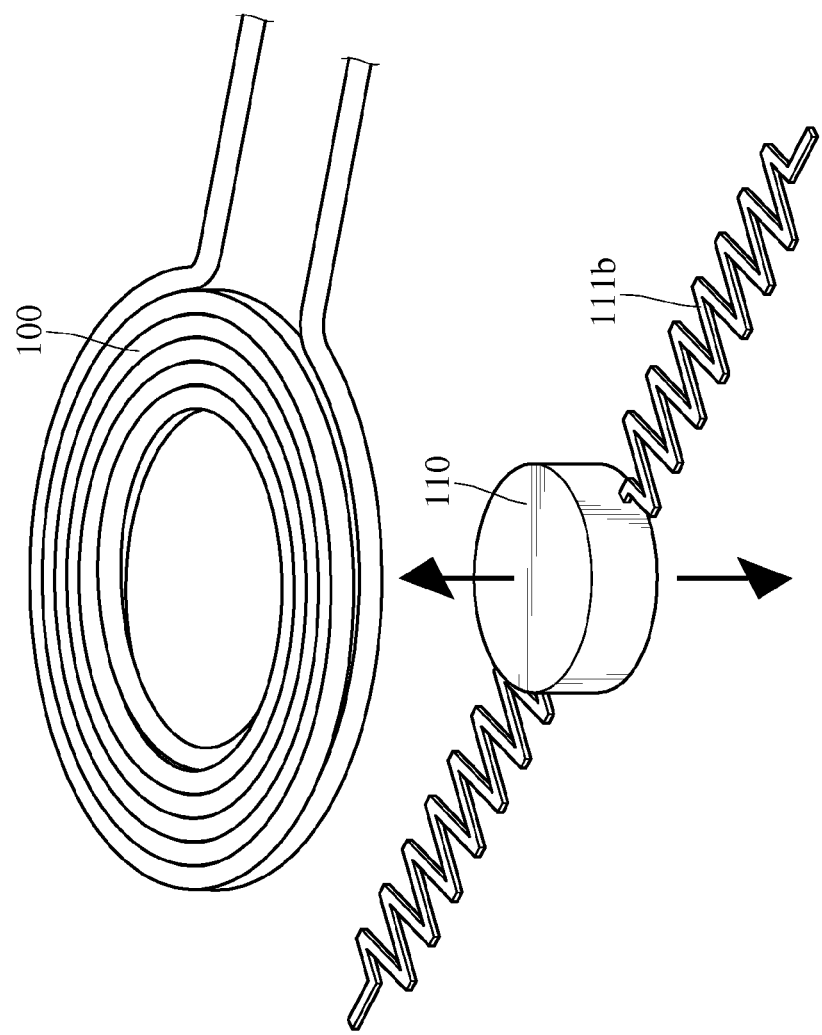
FIG. 4B is a structural diagram of the coil, the magnetic body, and the elastic unit according to the second embodiment.

Please refer to FIG. 4A and FIG. 4B. FIG. 4A is a structural diagram of the coil, the magnetic body, and the elastic unit according to the first embodiment. FIG. 4B is a structural diagram of the coil, the magnetic body, and the elastic unit according to the second embodiment. As shown in FIG. 4A, the elastic unit 111*a* is a spring, and the magnetic body 110 is a magnet, and the elastic unit 111*a* is connected to an end of the magnetic body 110, and the magnetic body 110 is in the extension direction of the central axis of the coil 100. As shown in FIG. 4B, the elastic unit 111*b* is connected to the two ends of the magnetic body 110, and the magnetic body 110 is also in the extension direction of the central axis of the coil 100. Therefore, when the user shakes the wireless charging transceiver device with the structure illustrated in FIG. 4A or FIG. 4B, the magnetic body 110 moves along the central axis of the coil 100 repeatedly, and the amount of the first inducing current is effectively increased by the elastic unit 111*a* or the elastic unit 111*b*.

In addition, the wireless charging transceiver device 1' and the wireless charging transceiver device 1" in the present disclosure both include the magnetic body 110, so when the wireless charging transceiver device 1' or the wireless charging transceiver device 1" operates in the second mode or the third mode, a magnetic body which has opposite magnetism or a metal such as iron, cobalt, nickel, is disposed in the position of the inducing coil of another corresponding wireless charging transmission device or wireless charging receiving device, so that the inducing coil of the wireless charging transmission device or the wireless charging receiving device easily aligns the coil 100 of the wireless charging transceiver device 1' or the wireless charging transceiver device 1".

Besides, when the wireless charging transceiver device 1' or the wireless charging transceiver device 1" of the present disclosure operates in the second or third mode, the magnetic body 110 of the wireless charging transceiver device 1' or the wireless charging transceiver device 1" is further locked and fixed, so that the magnetic body 110 is not able to be moved respect to the coil 100 until the wireless charging transceiver device 1' or the wireless charging transceiver device 1" stops operating in the second or third mode.

Figure 5:
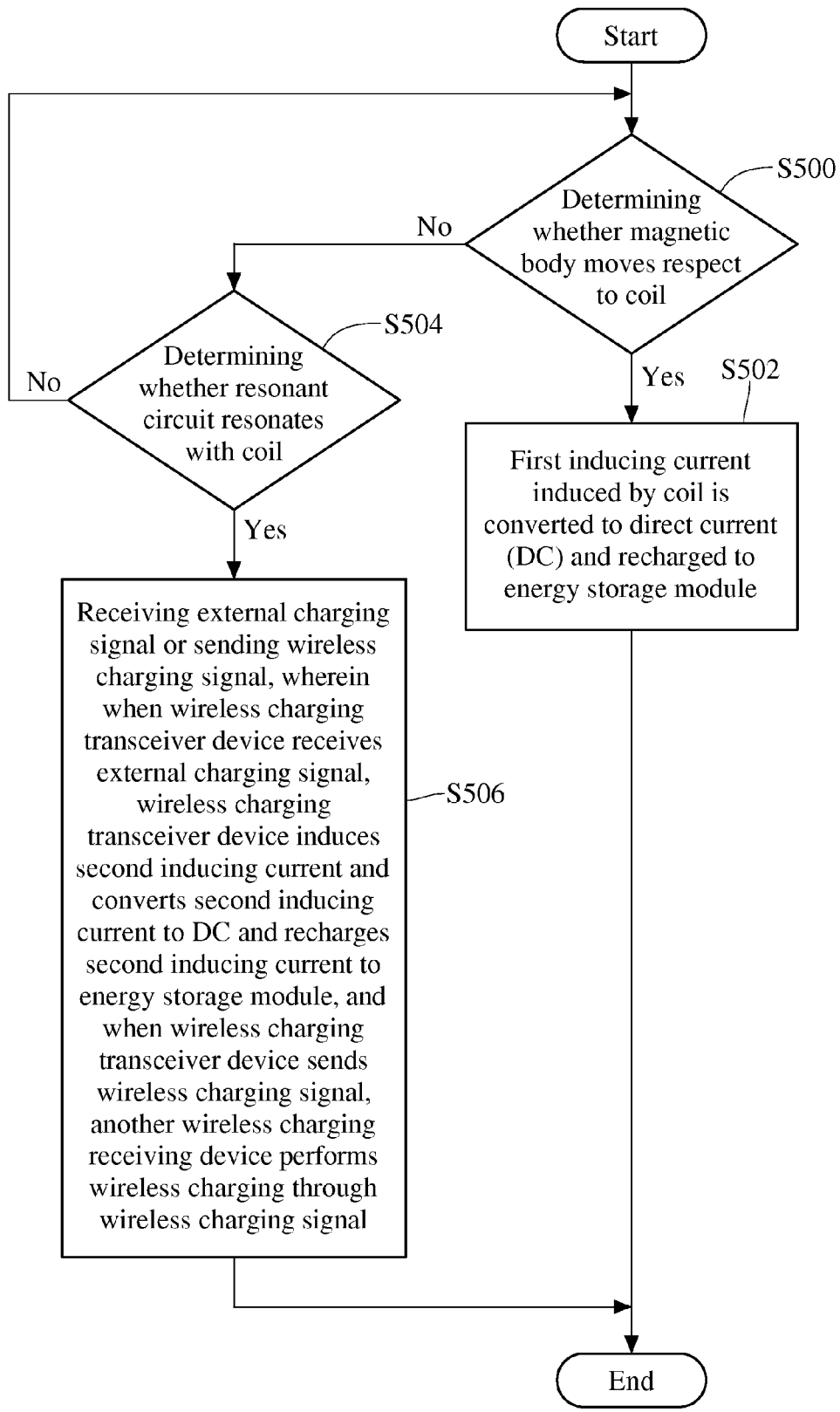
FIG. 5 is a flowchart of a wireless charging control method according to the first embodiment.

Please refer to FIG. 3 and FIG. 5. FIG. 5 is a flowchart of a wireless charging control method according to the first embodiment. As shown in FIG. 5, the wireless charging control method of the present embodiment is adapted for the wireless charging transceiver device 1" in FIG. 3 and the connections and actuations of each of functional modules of the wireless charging transceiver device 1" are explained in the previous embodiment and are not further explained hereinafter. The details of each step of the wireless charging control method in the present embodiment are explained as follows.

In the step S500, the wireless charging transceiver device 1" determines whether the magnetic body 110 moves respect to the coil 100. When the wireless charging transceiver device 1" determines that the magnetic body 110 moves respect to the coil 100, the step S502 is executed. When the wireless charging transceiver device 1" determines that the magnetic body 110 does not move respect to the coil 100, the step S504 is executed. In the step S502, the wireless charging transceiver device 1" converts the first inducing current generated by the coil 100 to DC and recharges the first inducing current to the energy storage module 102.

In the step S504, the wireless charging transceiver device 1" determines whether the resonant circuit 108 resonates with the coil 100, that is, the wireless charging transceiver device 1" determines whether the device operates in the second or third mode. When the wireless charging transceiver device 1" determines that the resonant circuit 108 resonates with the coil 100, the step S506 is executed. When the wireless charging transceiver device 1" determines that the resonant circuit 108 does not resonate with the coil 100, the step S500 is executed again.

In the step S506, the wireless charging transceiver device 1" receives the external charging signal or sends the wireless charging signal. The external charging signal is generated by a wireless charging transmission device, and when the wireless charging transceiver device 1" receives the external charging signal, the wireless charging transceiver device 1" induces a second inducing current and converts the second inducing current to DC and recharges the second inducing current to the energy storage module 102. When the wireless charging transceiver device 1" sends the wireless charging signal, another wireless charging receiving device performs wireless charging by inducing the wireless charging signal.

Figure 6:
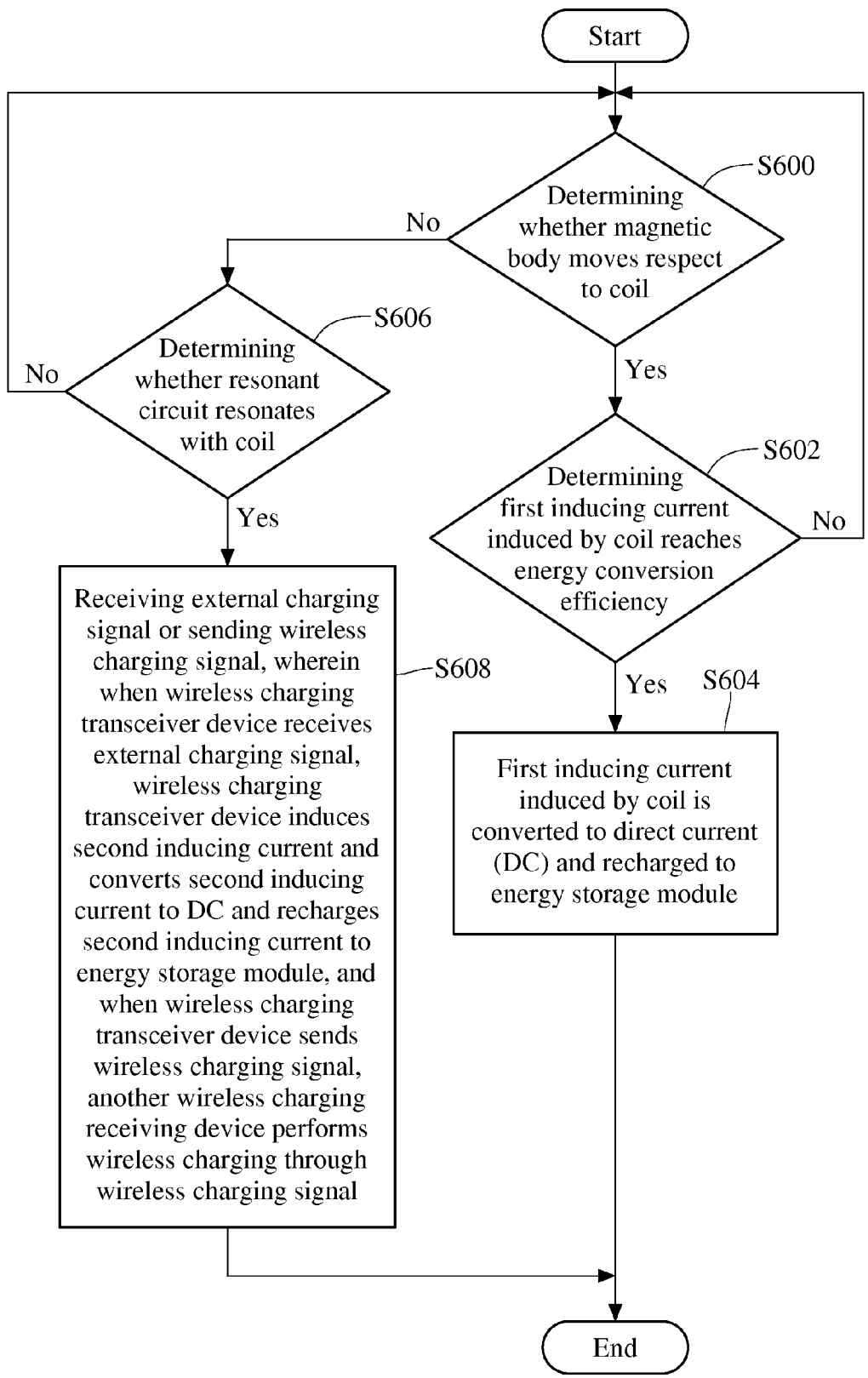
FIG. 6 is a flowchart of a wireless charging control method according to the second embodiment.

Please refer to FIG. 3 and FIG. 6. FIG. 6 is a flowchart of a wireless charging control method according to the second embodiment. As shown in FIG. 6, the wireless charging control method of the present embodiment is adapted for the wireless charging transceiver device 1" in FIG. 3 and the connections and actuations of each of functional modules of the wireless charging transceiver device 1" are explained in the previous embodiment and are not further explained hereinafter. The details of each step of the wireless charging control method in the present embodiment are explained as follows.

In the step S600, the wireless charging transceiver device 1" determines whether the magnetic body 110 moves respect to the coil 100. When the wireless charging transceiver device 1" determines that the magnetic body 110 moves respect to the coil 100, the step S602 is executed. When the wireless charging transceiver device 1" determines that the magnetic body 110 does not move respect to the coil 100, the step S606 is executed. In the step S602, the wireless charging transceiver device 1" determines whether the first inducing current generated by the coil 100 reaches the energy conversion efficiency. When the wireless charging transceiver device 1" determines that the first inducing current generated by the coil 100 reaches the energy conversion efficiency, the step S604 is executed. When the wireless charging transceiver device 1" determines that the first inducing current generated by the coil 100 does not reach the energy conversion efficiency, the step S600 is executed again.

In the step S604, the wireless charging transceiver device 1" converts the first inducing current to DC and recharges the first inducing current to the energy storage module 102. In the step S606, the wireless charging transceiver device 1" determines whether the resonant circuit 108 resonates with the coil 100, that is, the wireless charging transceiver device 1" determines whether the device operates in the second or third mode. When the wireless charging transceiver device 1" determines that the resonant circuit 108 resonates with the coil 100, the step S608 is executed. When the wireless charging transceiver device 1" determines that the resonant circuit 108 does not resonate with the coil 100, the step S600 is executed again. In addition, the step S608 in FIG. 6 is the same as the step S506 in FIG. 5 and is not further explained in the present embodiment.

Figure 7:
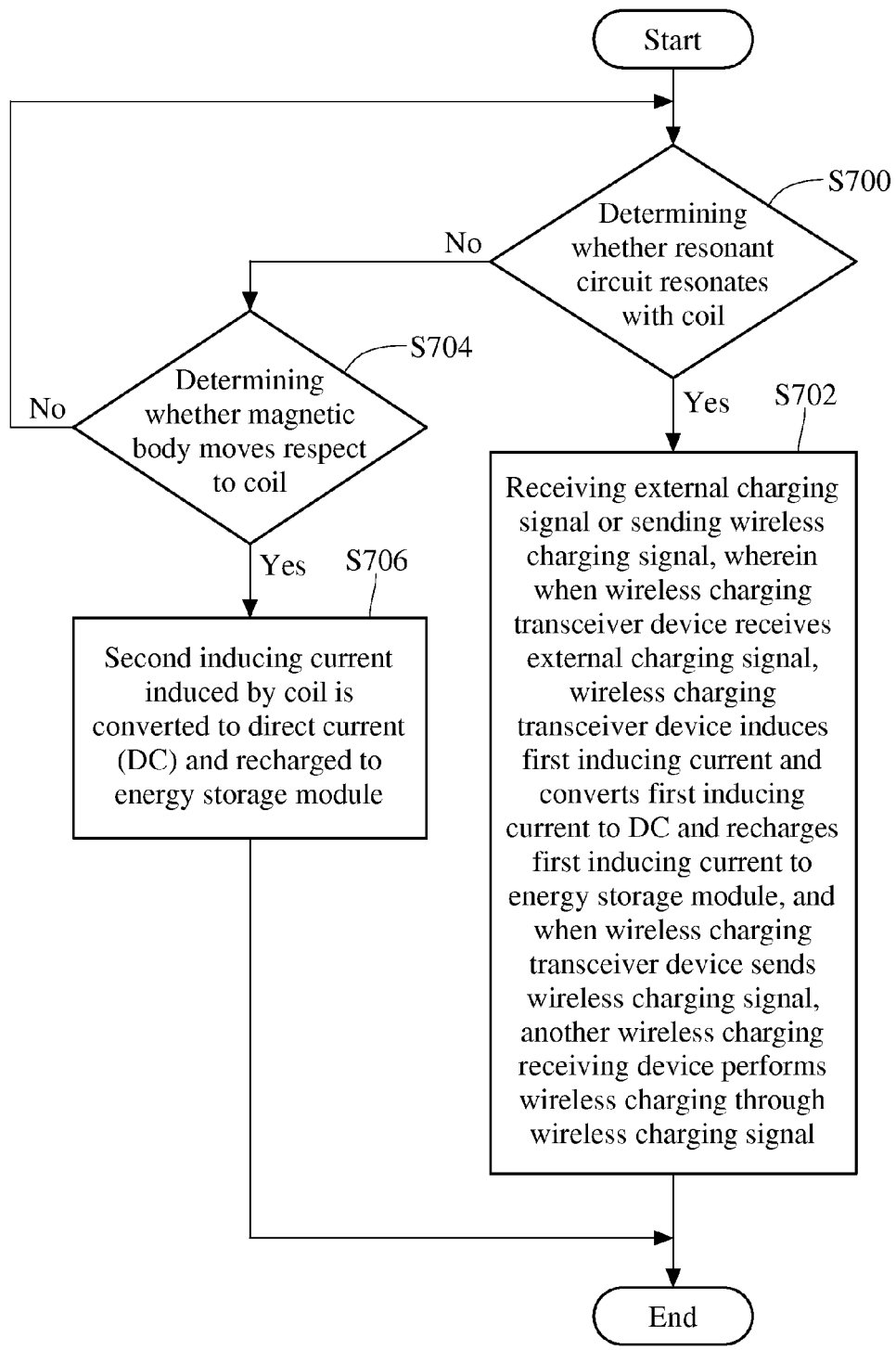
FIG. 7 is a flowchart of a wireless charging control method according to the third embodiment.

Please refer to FIG. 3 and FIG. 7. FIG. 7 is a flowchart of a wireless charging control method according to the third embodiment. As shown in FIG. 7, the wireless charging control method of the present embodiment is adapted for the wireless charging transceiver device 1" in FIG. 3 and the connections and actuations of each of functional modules of the wireless charging transceiver device 1" are explained in the previous embodiment and are not further explained hereinafter. The details of each step of the wireless charging control method in the present embodiment are explained as follows.

In the step S700, the wireless charging transceiver device 1" determines whether the resonant circuit 108 resonates with the coil 100. When the wireless charging transceiver device 1" determines that the resonant circuit 108 resonates with the coil 100, the step S702 is executed. When the wireless charging transceiver device 1" determines that the resonant circuit 108 does not resonate with the coil 100, the step S704 is executed.

In the step S702, the wireless charging transceiver device 1" receives the external charging signal or sends the wireless charging signal. The external charging signal is generated by a wireless charging transmission device and when the wireless charging transceiver device 1" receives the external charging signal, the wireless charging transceiver device 1" induces the first inducing current and converts the first inducing current to DC and recharges the first inducing current to the energy storage module 102. When the wireless charging transceiver device 1" sends the wireless charging signal, another wireless charging receiving device performs wireless chagrining by inducing the wireless charging signal.

In the step S704, the wireless charging transceiver device 1" determines whether the magnetic body 110 moves respect to the coil 100. When the wireless charging transceiver device 1" determines that the magnetic body 110 moves respect to the coil 100, the step 
S706 is executed. When the wireless charging transceiver device 1" determines that the magnetic body 110 does not move respect to the coil 100, the step S700 is executed again. In the step S706, the wireless charging transceiver device 1" converts the second inducing current generated by the coil 100 to DC and recharges the second inducing current to the energy storage module 102.

The determination steps of the wireless charging control method in the present embodiment are first determining whether the resonant circuit 108 resonates with the coil 100 in the step S700 and further determining whether the magnetic body 110 moves respect to the coil 100 in the step S704, and the determination steps of the wireless charging control method in the first and second embodiment are first determining whether the magnetic body 110 moves respect to the coil 100 in the steps S500 and S600 and further determining whether the resonant circuit 108 resonates with the coil 100 in the steps S504 and S606. Therefore, the first inducing current in the present embodiment is the second inducing current in the previous embodiments, and the second inducing current in the present embodiment is the first inducing current in the previous embodiments.

Figure 8:
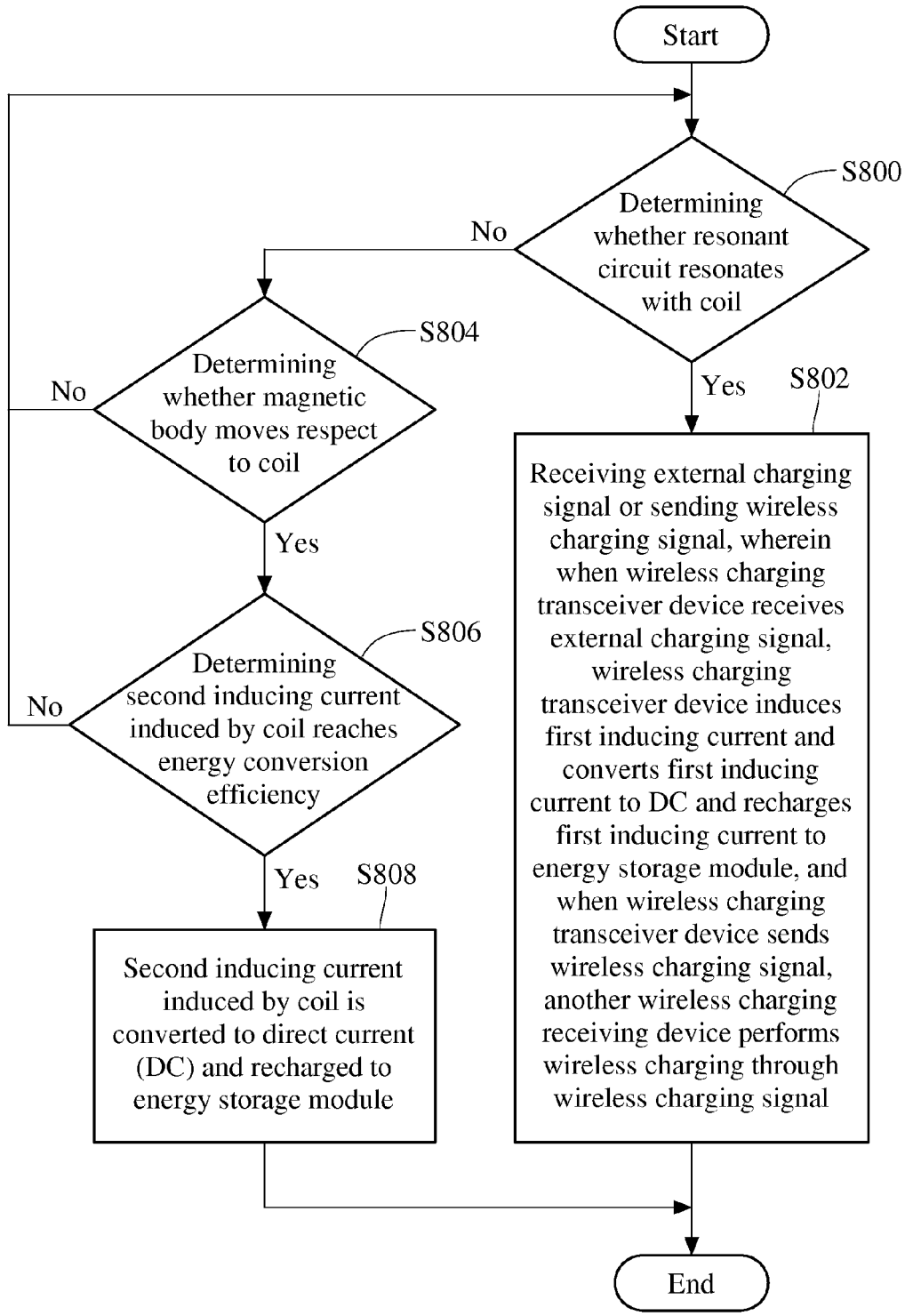
FIG. 8 is a flowchart of a wireless charging control method according to the fourth embodiment.

Please refer to FIG. 3 and FIG. 8. FIG. 8 is a flowchart of a wireless charging control method according to the fourth embodiment. As shown in FIG. 8, the wireless charging control method of the present embodiment is adapted for the wireless charging transceiver device 1" in FIG. 3 and the connections and actuations of each of functional modules of the wireless charging transceiver device 1" are explained in the previous embodiment and are not further explained hereinafter. The details of each step of the wireless charging control method in the present embodiment are explained as follows.

In the step S800, the wireless charging transceiver device 1" determines whether the resonant circuit 108 resonates with the coil 100. When the wireless charging transceiver device 1" determines that the resonant circuit 108 resonates with the coil 100, the step S802 is executed. When the wireless charging transceiver device 1" determines that the resonant circuit 108 does not resonate with the coil 100, the step S804 is executed. In addition, the step S802 in FIG. 8 is the same as the step S702 in FIG. 7 and is not further explained in the present embodiment.

In the step S804, the wireless charging transceiver device 1" determines whether the magnetic body 110 moves respect to the coil 100. When the wireless charging transceiver device 1" determines that the magnetic body 110 moves respect to the coil 100, the step S806 is executed. When the wireless charging transceiver device 1" determines that the magnetic body 110 does not move respect to the coil 100, the step S800 is executed again. In the step S806, the wireless charging transceiver device 1" determines whether the second inducing current generated by the coil 100 reaches the energy conversion efficiency. When the wireless charging transceiver device 1" determines that the second inducing current generated by the coil 100 reaches the energy conversion efficiency, the step S808 is executed. When the wireless charging transceiver device 1" determines that the second inducing current generated by the coil 100 does not reach the energy conversion efficiency, the step S800 is executed again. In the step S808, the wireless charging transceiver device 1" converts the second inducing current to DC and recharges the second inducing current to the energy storage module 102.

The determination steps of the wireless charging control method in the present embodiment are first determining whether the resonant circuit 108 resonates with the coil 100 in the step S800 and further determining whether the magnetic body 110 moves respect to the coil 100 in the step S804, and the determination steps of the wireless charging control method in the first and second embodiment are first determining whether the magnetic body 110 moves respect to the coil 100 in the steps S500 and S600 and further determining whether the resonant circuit 108 resonates with the coil 100 in the steps S504 and S606. Therefore, the first inducing current in the present embodiment is the second inducing current in the previous embodiments, and the second inducing current in the present embodiment is the first inducing current in the previous embodiments.

The present disclosure provides a wireless charging transceiver device and a wireless charging control method, and the wireless charging transceiver device adopts the design of the single coil and the switch module, so that when the coil induces the external magnetic field and induces the first inducing current, the switch module conducts the first electrical path between the coil and the energy storage module and the first inducing current is converted to the charging current and recharged to the energy storage module. When the switch module conducts the second electrical path between the coil and the energy storage module, the coil sends the wireless charging signal to a wireless charging receiving device or receives the external charging signal generated by a wireless charging transmission device. When the coil sends the wireless charging signal, the wireless charging receiving device performs wireless charging by receiving the wireless charging signal. When the coil receives the external charging signal, a second inducing current is induced in the second electrical path and the second inducing current is converted to the charging current and recharged to the energy storage module.

Therefore, the three modes of the wireless charging transceiver device and the wireless charging control method in the present disclosure are achieved by the design of a single coil, a magnetic body and a switch module, wherein the first mode is the energy storing mode of autonomous charging, and the second mode is the wireless charging mode, and the third mode is the wireless electricity receiving mode. In addition, the wireless charging transceiver device and the wireless charging control method in the present disclosure are adapted for the Qi standards of the Wireless Power Consortium (WPC), the PMA standards of the Power Matters Alliance (PMA), and the Rezence standards of the Alliance for Wireless Power (A4WP). Besides, because there is only one coil needed in the wireless charging transceiver device and the wireless charging control method in the present disclosure, the manufacture cost is effectively reduced and the product is more light and thin, and device is able to perform electricity recharging to the energy storage module by shaking the wireless charging transceiver device to enhance the practicality of the product.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A wireless charging transceiver device, comprising:
   an energy storage module;
   a coil for inducing an external magnetic field or receiving an external charging signal, and sending a wireless charging signal;
   a switch module for coupling the energy storage module to the coil with a first electrical path or a second electrical path selectively;
   a rectifier circuit in the first electrical path, and coupled between the energy storage module and the switch module, for rectifying a first inducing current induced from the first electrical path by the external magnetic field in a first mode; and
   a resonant circuit in the second electrical path, and coupled between the energy storage module and the switch module, wherein the wireless charging signal is sent to the coil through the second electrical path in a second mode and a second inducing current is induced in the second electrical path according to the external charging signal in a third mode;
   wherein the first inducing current and the second inducing current are charging currents recharged to the energy storage module.

2. The device of claim 1, wherein the wireless charging transceiver device further comprises a magnetic body near the coil, and the external magnetic field is generated according to the movement of the magnetic body respect to the coil, and the first inducing current is generated when the coil induces the external magnetic field.

3. The device of claim 2, wherein in the second mode or the third mode, the magnetic body is locked and is not relatively movable respect to the coil.

4. The device of claim 2, wherein the wireless charging transceiver device further comprises an elastic unit connected to the magnetic body, and the elastic unit is for storing energy when shaking the wireless charging transceiver device for moving the magnetic body respect to the coil, and for releasing temporarily stored energy when the wireless charging transceiver device stops shaking.

5. The device of claim 2, wherein the wireless charging transceiver device further comprises a first detecting module for detecting whether the magnetic body moves respect to the coil and for generating a first detecting signal accordingly, and the first detecting signal is for indicating the movement range when the magnetic body moves respect to the coil.

6. The device of claim 5, wherein the wireless charging transceiver device further comprises a control module coupled between the first detecting module and the switch module, and the control module is for determining whether the first inducing current reaches an energy conversion efficiency according to the first detecting signal to selectively control the switch module to be coupled between the energy storage module and the coil through the first electrical path.

7. The device of claim 6, wherein the wireless charging transceiver device further comprises a second detecting module coupled between the resonant circuit and the control module, and the second detecting module is for detecting whether the resonant circuit resonates with the coil and generating a second detecting signal accordingly, and the second detecting signal is for indicating a resonant frequency of the resonant circuit.

8. A wireless charging control method for a wireless charging transceiver device, the wireless charging transceiver device having a magnetic body, a coil, a resonant circuit, and an energy storage module, the magnetic body near the coil, the resonant circuit coupled to the energy storage module, the coil selectively coupled to the resonant circuit, the method comprising:
   determining whether the magnetic body moves respect to the coil;
   when the magnetic body moves respect to the coil, a first inducing current is converted to direct current (DC) and recharged to the energy storage module, wherein the first inducing current is induced when the coil induces an external magnetic field, and the external magnetic field is generated according to the movement of the magnetic body respect to the coil;
   when the magnetic body does not move respect to the coil, further determining whether the resonant circuit resonates with the coil; and
   when the resonant circuit resonates with the coil, the wireless charging transceiver device receiving an external charging signal or sending a wireless charging signal, wherein the external charging signal is generated by a wireless charging transmission device, and the wireless charging transceiver device induces a second inducing current when the wireless charging transceiver device receives the external charging signal, and the wireless charging transceiver device converts the second inducing current to DC and recharges the second inducing current to the energy storage module, and a wireless charging receiving device performs wireless charging through the wireless charging signal when the wireless charging transceiver device sends the wireless charging signal.

9. The method of claim 8, wherein when the magnetic body moves respect to the coil, whether the first inducing current induced by the coil reaches an energy conversion efficiency is determined to selectively convert the first inducing current to DC and recharge the first inducing current to the energy storage module.

10. The method of claim 9, wherein when the first inducing current induced by the coil reaches the energy conversion efficiency, the first inducing current is converted to DC and recharged to the energy storage module, and when the first inducing current induced by the coil does not reach the energy conversion efficiency, the step of determining whether the magnetic body moves respect to the coil is executed again.

11. The method of claim 8, wherein when the resonant circuit does not resonate with the coil, the step of determining whether the magnetic body moves respect to the coil is executed again.

12. A wireless charging control method for a wireless charging transceiver device, the wireless charging transceiver device having a magnetic body, a coil, a resonant circuit, and an energy storage module, the magnetic body near the coil, the resonant circuit coupled to the energy storage module, the coil selectively coupled to the resonant circuit, the method comprising:
   determining whether the resonant circuit resonates with the coil;
   when the resonant circuit resonates with the coil, the wireless charging transceiver device receiving an external charging signal or sending a wireless charging signal, wherein the external charging signal is generated by a wireless charging transmission device, and the wireless charging transmission device generates a first inducing current when receiving the external charging signal, and the wireless charging transmission device converts the first inducing current to DC and recharges the first inducing current to the energy storage module, and a wireless charging receiving device performs wireless charging by inducing the wireless charging signal when the wireless charging transceiver device sends the wireless charging signal; and
   when the resonant circuit does not resonate with the coil, further determining whether the magnetic body moves respect to the coil to selectively convert a second inducing current to DC and recharge the second inducing current to the energy storage module, wherein the second inducing current is induced when the coil induces an external magnetic field, and the external magnetic field is generated by the movement of the magnetic body respect to the coil.

13. The method of claim 12, wherein when the magnetic body moves respect to the coil, whether the second inducing current induced by the coil reaches an energy conversion efficiency is further determined to selectively convert the second inducing current to DC and recharge the second inducing current to the energy storage module.

14. The method of claim 13, wherein when the second inducing current induced by the coil reaches the energy conversion efficiency, the second inducing current is converted to DC and recharged to the energy storage module, and when the second inducing current induced by the coil does not reach the energy conversion efficiency, the step of determining whether the resonant circuit resonates with the coil is executed again.

15. The method of claim 13, wherein when the magnetic body does not move respect to the coil, the step of determining whether the resonant circuit resonates with the coil is executed again.

* * * * *